(12) United States Patent
Spangler et al.

(10) Patent No.: US 10,808,552 B2
(45) Date of Patent: Oct. 20, 2020

(54) TRIP STRIP CONFIGURATION FOR GASPATH COMPONENT IN A GAS TURBINE ENGINE

(71) Applicant: United Technologies Corporation, Farmington, CT (US)

(72) Inventors: Brandon W. Spangler, Vernon, CT (US); Dominic J. Mongillo, Jr., West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 186 days.

(21) Appl. No.: 16/010,776

(22) Filed: Jun. 18, 2018

(65) Prior Publication Data

US 2019/0383149 A1 Dec. 19, 2019

(51) Int. Cl.
*F01D 5/18* (2006.01)
*F01D 9/04* (2006.01)
*F01D 11/08* (2006.01)

(52) U.S. Cl.
CPC .......... *F01D 5/188* (2013.01); *F01D 9/041* (2013.01); *F01D 11/08* (2013.01); *F05D 2220/323* (2013.01); *F05D 2220/3212* (2013.01); *F05D 2240/12* (2013.01); *F05D 2240/301* (2013.01); *F05D 2250/183* (2013.01); *F05D 2260/2212* (2013.01)

(58) Field of Classification Search
CPC .......... F01D 5/188; F01D 5/187; F01D 25/12; F01D 11/08; F01D 9/041; F05D 2260/2212; F05D 2250/183; F05D 2240/301; F05D 2240/12

USPC .......... 415/115; 416/97 R; 165/70
See application file for complete search history.

(56) References Cited

U.S. PATENT DOCUMENTS

| | | | | |
|---|---|---|---|---|
| 3,741,285 A | * | 6/1973 | Kuethe | B64C 21/10 165/181 |
| 4,627,480 A | * | 12/1986 | Lee | B22C 9/04 164/122.1 |
| 5,052,889 A | * | 10/1991 | Abdel-Messeh | F01D 5/187 165/170 |
| 5,413,458 A | * | 5/1995 | Calderbank | F01D 5/187 415/115 |
| 5,681,144 A | * | 10/1997 | Spring | F01D 5/187 415/115 |
| 5,797,726 A | * | 8/1998 | Lee | F01D 5/187 416/96 R |

(Continued)

FOREIGN PATENT DOCUMENTS

| | | |
|---|---|---|
| DE | 19526917 | 1/1997 |
| EP | 1914390 | 4/2008 |

(Continued)

OTHER PUBLICATIONS

The Extended European Search Report for European Patent Application No. 19180393.1, dated Nov. 12, 2019.

*Primary Examiner* — J. Todd Newton
(74) *Attorney, Agent, or Firm* — Carlson, Gaskey & Olds, P.C.

(57) ABSTRACT

A gaspath component for a gas turbine engine includes a platform having at least one internal cooling passage. The at least one internal cooling passage has a plurality of trip strips extending into the cooling passage from at least one internal surface of the cooling passage. Each of the trip strips is defined by a z-shaped configuration.

24 Claims, 6 Drawing Sheets

(56) References Cited

U.S. PATENT DOCUMENTS

| | | | |
|---|---|---|---|
| 7,544,044 B1* | 6/2009 | Liang | F01D 5/188 |
| | | | 416/96 R |
| 7,575,414 B2* | 8/2009 | Lee | F01D 5/186 |
| | | | 415/115 |
| 7,866,947 B2 | 1/2011 | Pietraszkiewicz et al. | |
| 8,109,726 B2* | 2/2012 | Liang | F01D 5/187 |
| | | | 416/97 R |
| 8,128,366 B2* | 3/2012 | Strock | F01D 5/186 |
| | | | 416/97 R |
| 8,317,475 B1 | 11/2012 | Downs | |
| 8,939,706 B1* | 1/2015 | Lee | F01D 11/122 |
| | | | 415/1 |
| 9,476,308 B2* | 10/2016 | Goeller | F01D 5/187 |
| 2006/0042255 A1* | 3/2006 | Bunker | F01D 25/14 |
| | | | 60/752 |
| 2009/0028692 A1* | 1/2009 | Surace | F01D 5/187 |
| | | | 415/115 |
| 2009/0180895 A1* | 7/2009 | Brittingham | F01D 5/225 |
| | | | 416/97 R |
| 2009/0180896 A1* | 7/2009 | Brittingham | F01D 5/225 |
| | | | 416/97 R |
| 2012/0163994 A1* | 6/2012 | Kwon | F01D 5/186 |
| | | | 416/97 R |
| 2012/0230838 A1* | 9/2012 | Hada | F01D 5/187 |
| | | | 416/97 R |
| 2014/0096527 A1 | 4/2014 | Bangerter et al. | |
| 2014/0219813 A1 | 8/2014 | Perez et al. | |
| 2015/0377029 A1* | 12/2015 | Blake | F01D 9/065 |
| | | | 416/232 |
| 2016/0146019 A1* | 5/2016 | Pizano | B22F 5/04 |
| | | | 415/115 |
| 2016/0186660 A1* | 6/2016 | Bergholz | F01D 5/18 |
| | | | 416/95 |
| 2016/0265775 A1 | 9/2016 | Cunha et al. | |
| 2016/0369637 A1* | 12/2016 | Subramanian | F01D 11/122 |
| 2017/0030202 A1* | 2/2017 | Itzel | F01D 5/188 |
| 2017/0096900 A1* | 4/2017 | Bunker | F01D 5/145 |
| 2018/0245472 A1* | 8/2018 | Spangler | F01D 9/065 |
| 2019/0376393 A1* | 12/2019 | Styborski | F01D 5/187 |
| 2019/0383149 A1* | 12/2019 | Spangler | F01D 11/08 |
| 2019/0383150 A1* | 12/2019 | Styborski | F01D 5/188 |

FOREIGN PATENT DOCUMENTS

| | | | |
|---|---|---|---|
| EP | 2019187 | 1/2009 | |
| WO | WO-2014042955 A1 * | 3/2014 | F01D 5/188 |
| WO | 2014052323 | 4/2014 | |

\* cited by examiner

TRIP STRIP CONFIGURATION FOR GASPATH COMPONENT IN A GAS TURBINE ENGINE

TECHNICAL FIELD

The present disclosure relates generally to gaspath component cooling systems, and more specifically to a z-shaped trip strip configuration for the same.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Gas turbine engines include multiple gaspaths defining flow from an ingestion point at a fore end of the engine to an exhaustion point at an aft end of the engine. Due to operation of the gas turbine engine, components exposed to, or spanning, the gaspaths are subjected to high levels of heat. In order to mitigate potential damage to the components from the exposure to the heat, some gaspath components are actively cooled by passing a coolant through cooling passages internal to the gaspath component.

SUMMARY OF THE INVENTION

In one exemplary embodiment a gaspath component for a gas turbine engine includes a platform including at least one internal cooling passage, and the at least one internal cooling passage having a plurality of trip strips extending into the cooling passage from at least one internal surface of the cooling passage, each of the trip strips being defined by a z-shaped configuration.

In another example of the above described gaspath component for a gas turbine engine the platform is one of a blade outer air seal a combustor panel, a vane platform, and a blade platform.

In another example of any of the above described gaspath components for a gas turbine engine the z-shaped configuration is continuous.

In another example of any of the above described gaspath components for a gas turbine engine the z-shaped configuration includes at least one discontinuity.

In another example of any of the above described gaspath components for a gas turbine engine the at least one discontinuity is positioned at one of a locally upstream most position and a locally downstream most position of the trip strip.

In another example of any of the above described gaspath components for a gas turbine engine the at least one internal cooling passage includes a first internal cooling passage and a second internal cooling passage, and wherein the first internal cooling passage is adjacent a first platform edge.

In another example of any of the above described gaspath components for a gas turbine engine a locally upstream most portion of each trip strip within the first internal cooling passage contacts a wall adjacent to the first platform edge.

In another example of any of the above described gaspath components for a gas turbine engine the second internal cooling passage is adjacent to a second platform edge, and wherein a locally upstream most portion of each trip strip within the second internal cooling passage contacts a wall adjacent to the second platform edge.

In another example of any of the above described gaspath components for a gas turbine engine an orientation of each trip strip in the first internal cooling passage is inverted relative to an orientation of each trip strip in the second internal cooling passage.

In another example of any of the above described gaspath components for a gas turbine engine each of the trip strips includes a plurality of z-shaped configurations, each of the z-shaped configurations being defined by a first segment, a second segment and a third segment and wherein at least one of the first segment and the third segment of a given z-shaped configuration is the other of the first segment and the third segment of an adjacent z-shaped configuration.

In another example of any of the above described gaspath components for a gas turbine engine each of the first segments and each of the third segments has the same length.

In another example of any of the above described gaspath components for a gas turbine engine at least one of the first segments and the third segments has a distinct length from at least one other of the first segments and the third segments.

In another example of any of the above described gaspath components for a gas turbine engine an angle defined by the trip strip at a locally upstream most position is distinct from an angle defined by the trip strip at a corresponding locally downstream most position.

In another example of any of the above described gaspath components for a gas turbine engine each angle defined by a locally upstream most position of the z-shaped trip strip is identical.

In another example of any of the above described gaspath components for a gas turbine engine at least one angle defined by a locally upstream most position of the z-shaped trip strip is distinct form at an angle defined by at least one other locally upstream most position of the z-shaped trip strip.

In one exemplary embodiment a gaspath component for a gas turbine engine includes an airfoil shaped component including at least one internal cooling passage, and the at least one internal cooling passage having a plurality of trip strips extending into the cooling passage from at least one internal surface of the cooling passage, each of the trip strips being defined by a discontinuous z-shaped configuration.

In another example of the above described gaspath component for a gas turbine engine the airfoil shaped component is one of a blade and a vane.

In another example of any of the above described gaspath components for a gas turbine engine the at least one internal cooling passage includes a first internal cooling passage and a second internal cooling passage, and wherein the first internal cooling passage is adjacent a leading edge of the airfoil shaped component.

In another example of any of the above described gaspath components for a gas turbine engine a locally upstream most portion of each trip strip within the first internal cooling passage contacts a leading edge wall.

In another example of any of the above described gaspath components for a gas turbine engine the second internal cooling passage is adjacent to a trailing edge of the airfoil shaped component, and wherein a locally upstream most portion of each trip strip within the second internal cooling passage is adjacent to the trailing edge of the airfoil shaped component.

In another example of any of the above described gaspath components for a gas turbine engine an orientation of each trip strip in the first internal cooling passage is inverted relative to an orientation of each trip strip in the second internal cooling passage.

In another example of any of the above described gaspath components for a gas turbine engine at least one discontinuity of the discontinuous z-shaped configuration is positioned at one of a locally upstream most position and a locally downstream most position of the trip strip.

In another example of any of the above described gaspath components for a gas turbine engine a first upstream most position and a second upstream most position of each trip strip in the plurality of trip strips is at a same position, relative to an expected flow of fluid through the internal cooling passage.

Another example of any of the above described gaspath components for a gas turbine engine further includes a platform from which the airfoil shaped component extends, and wherein the platform includes at least one internal platform cooling passage having a plurality of z-shaped trip strips.

In another example of any of the above described gaspath components for a gas turbine engine each trip strip in the internal platform cooling passage is discontinuous These and other features of the present invention can be best understood from the following specification and drawings, the following of which is a brief description.

DETAILED DESCRIPTION

Figure 1:
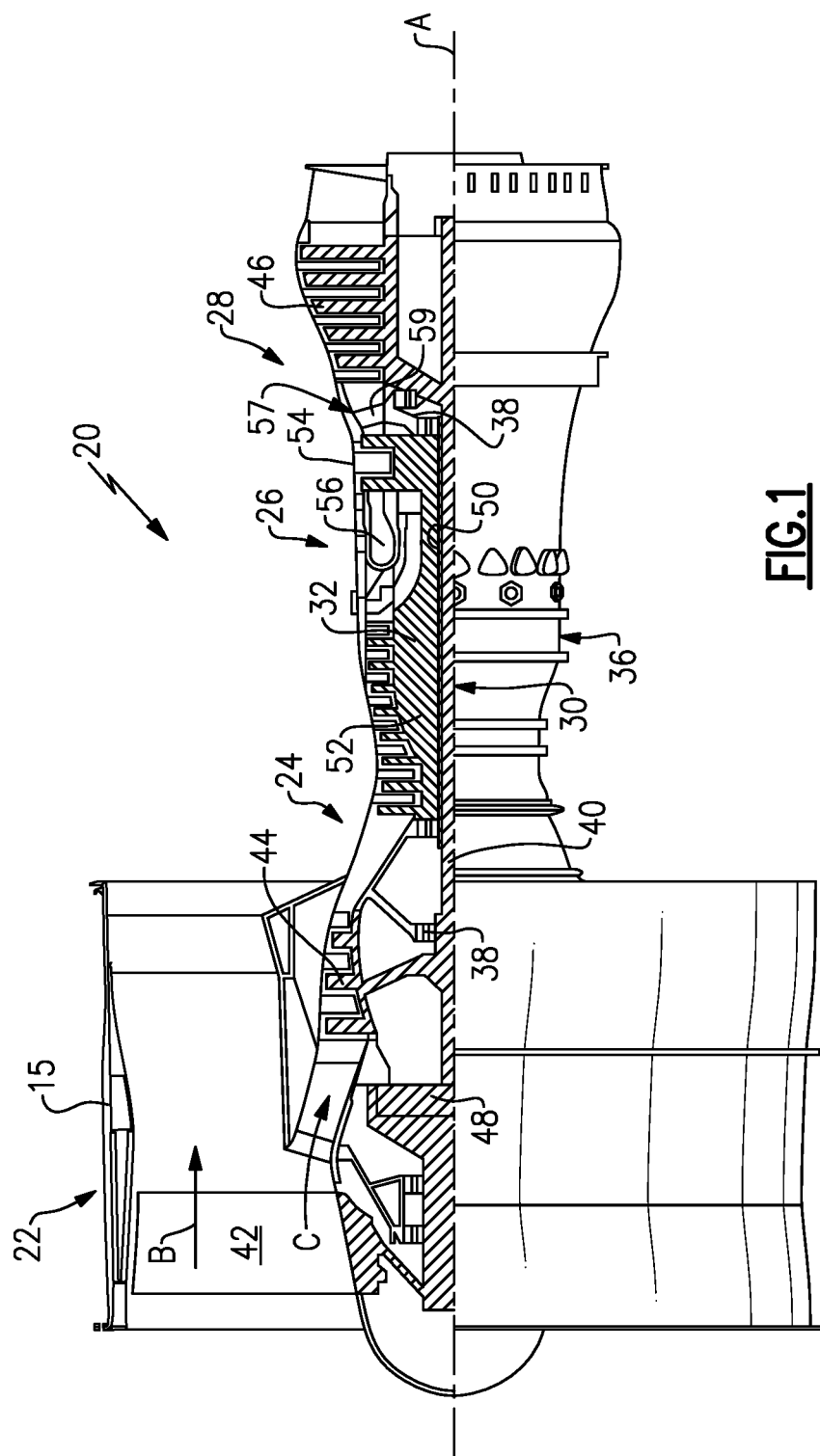
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
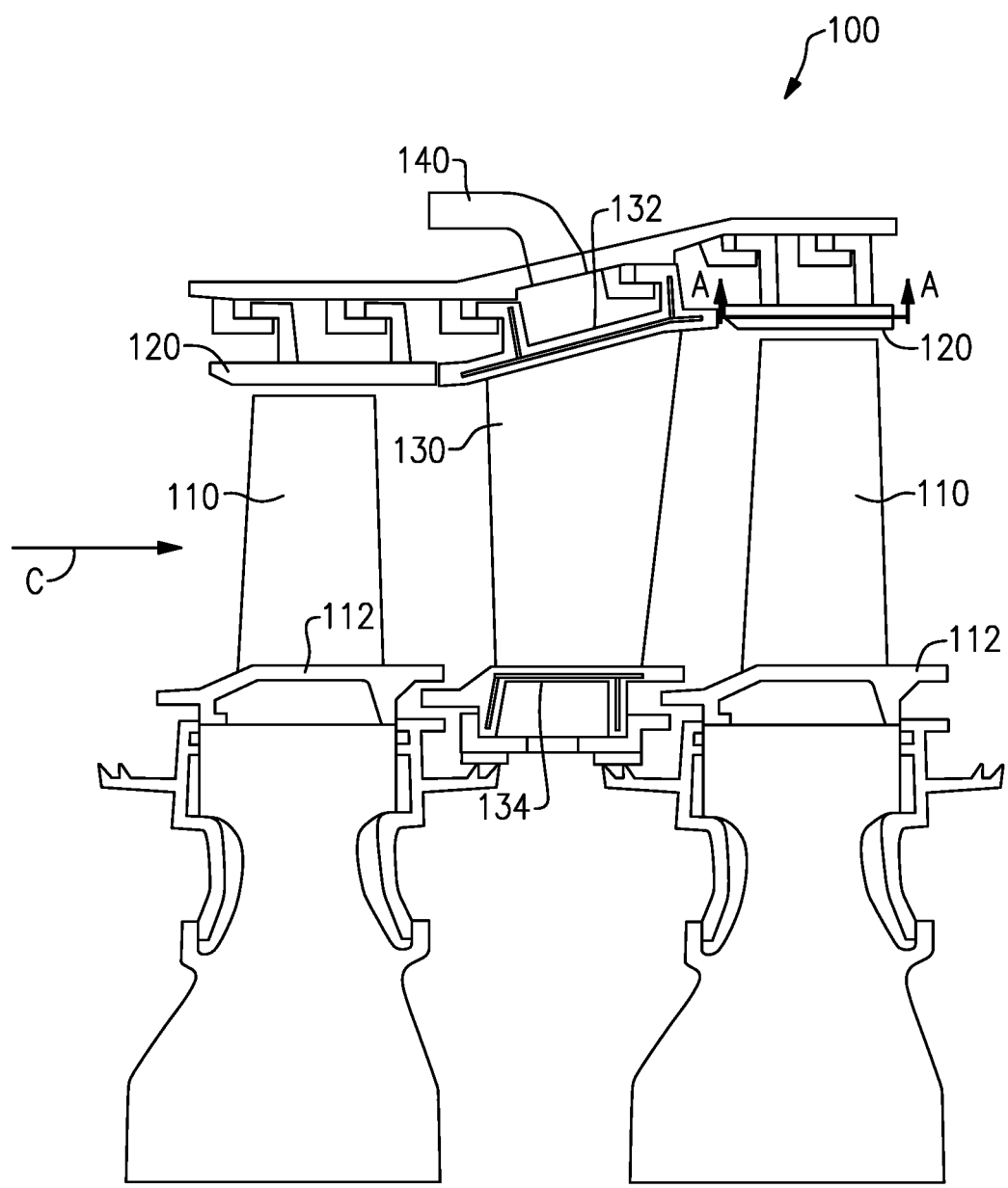
FIG. 2 schematically illustrates a portion of the turbine section of the gas turbine engine of FIG. 1.

With continued reference to FIG. 1, FIG. 2 schematically illustrates a portion 100 of the turbine section 28. The portion 100 includes a first and second turbine blade 110. Radially outward of each turbine blade 110 is a corresponding blade outer air seal (BOAS) 120. Due to their exposure to the hot gasses in the core flow path C, each of the BOAS 120 and the blades 110 are referred to as gaspath components. Each of the blades 110 extends radially outward and into the flow path C from a corresponding platform 112. Disposed between the blades 110 is a vane 130. The vane 130 spans the flow path C from a radially outward platform 132 to a radially inner platform 134.

Due to the position downstream of the combustor, the turbine section 28 is exposed to substantial amounts of heat during operation of the engine. The substantial heat can reduce the lifespan of, or otherwise degrade, one or more of the gaspath components. In order to minimize the negative impact of the exposure, one or more of the blades 110, BOAS 120, vane 130, and platforms 112, 132, 134 include internal cooling passages that receive a cooling fluid from another engine system. The cooling fluid is passed through the internal passages, thereby cooling the gaspath component. By way of example, cooling air provided to the gaspath component can be received from a compressor bleed, a cooled cooling air system, or any other source of cooling fluid. In the illustrated example of FIG. 2, the cooling fluid is received via a cool air port 140 positioned at a radially outward edge of the portion 100. In alternative examples, the cooling fluid can be received from any number of known alternative cooling fluid sources instead of, or in addition to, the cool air port 140 and operate in a similar manner.

Figure 3B:
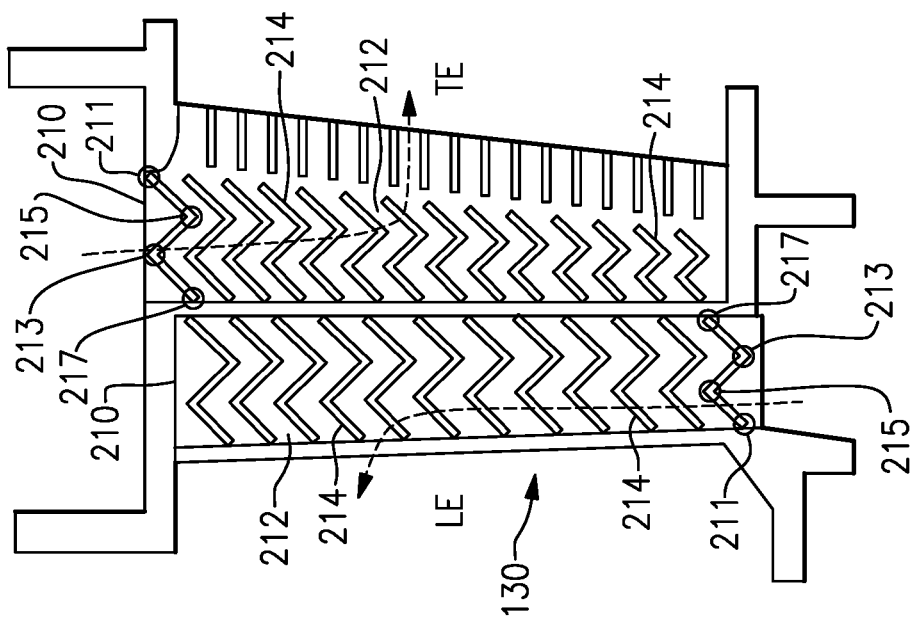
FIGS. 3A and 3B schematically illustrate an exemplary turbine blade (FIG. 3A) and turbine vane (FIG. 3B) incorporating z-shaped trip strips within internal cooling passages.
Figure 3A:
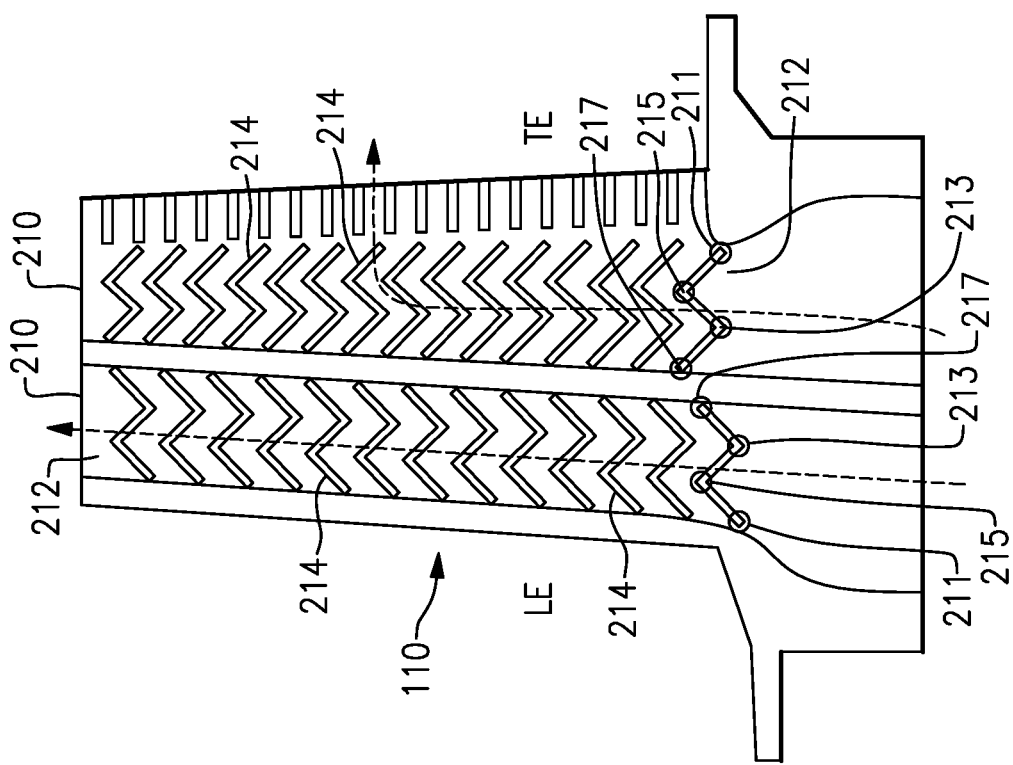
Figure 4:
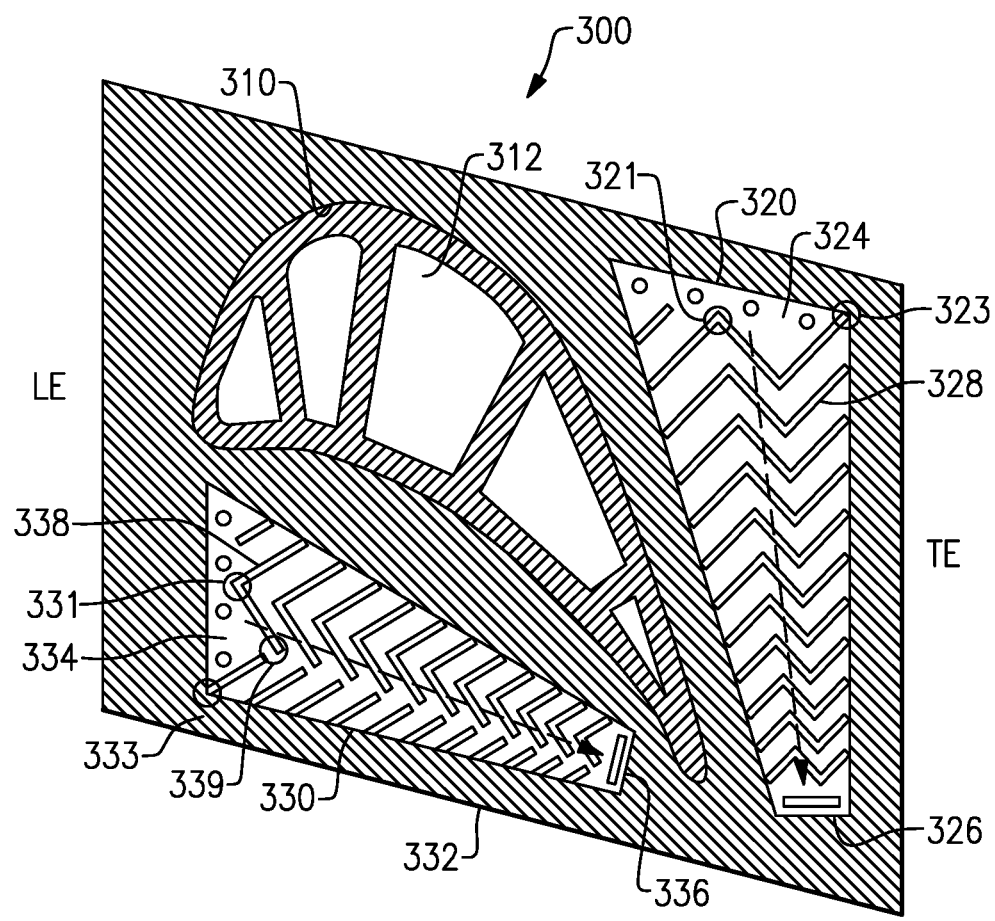
FIG. 4 schematically illustrates an exemplary vane or blade platform incorporating z-shaped trip strips within internal cooling passages.
Figure 5:
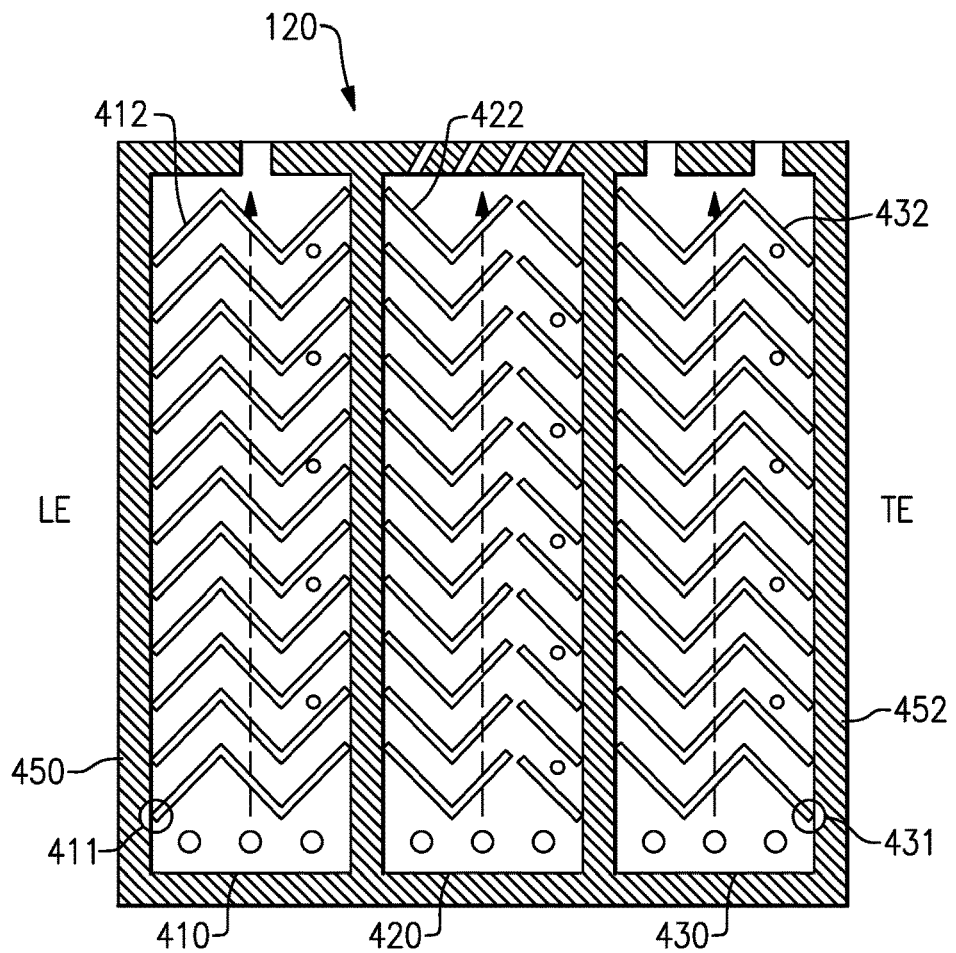
FIG. 5 schematically illustrates a cross section of a blade outer air seal platform incorporating z-shaped trip strips within internal cooling passages.
Figure 6:
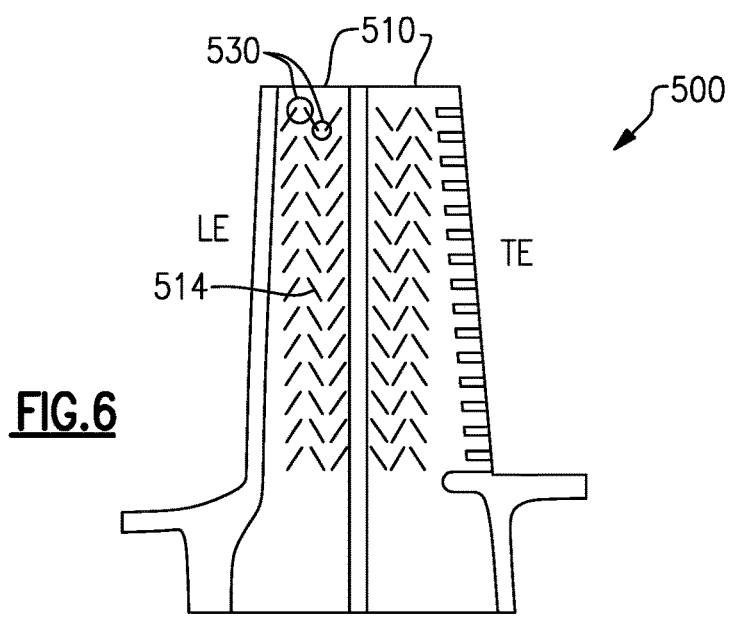
FIG. 6 schematically illustrates an exemplary turbine blade incorporating z-shaped trip strips within internal cooling passages.

With continued reference to FIG. 2, and with like numerals indicating like elements, FIGS. 3A and 3B schematically illustrate exemplary internal cooling passages of a blade 110 (FIG. 3A) and a vane 130 (FIG. 3B). Included within each gaspath component are multiple internal cooling passages 210. Each internal cooling passage 210 is defined by a set of walls 212 and includes multiple turbulating features disposed on at least one of the walls 212. The exemplary turbulating features are trip strips 214 that protrude into the flowpath defined by the internal cooling passage. Each of the trip stripes 214 protrudes oblique to the wall.

Trip strips incorporated into existing gaspath components are typically either linear in nature, or include a chevron (v) shape. Linear trip strips have a high heat transfer ability at the upstream most portion of the trip strip, with the heat transfer capabilities of the trip strip declining as the trip strip proceeds downstream. As a result, any time the internal cavity is above a certain width dimension, the trip strips can undergo extensive heat transfer decay and be ineffective at at least one downstream position. Similarly, chevron shaped trip strips include an upstream most point from which two linear trip strip segments extend at a skewed orientation relative to the streamwise direction of the cooling flow. Due to the relatively reduced lengths of each of the trip strip segments the chevron configuration reduces the decay in convective heat transfer typically observed due to the thickening of the thermal boundary layer that occurs along the length of the trip surface, as the turbulence intensity of the local flow vortices are reduced resulting in lower heat transfer augmentation. Chevron trip strips typically exhibit the highest level of internal convective heat transfer at the apex formed by the intersection of each of the skewed trip strip segments. The location of the apex of the chevron trip configuration is typically more centrally located within the internal passage rather than at one of the edges, since it is desirable for both skewed segments of the chevron trip strip configuration to be of equivalent length. Having both skewed segments of the chevron trip strip minimizes the degradation in internal convective heat transfer that occurs with increasing trip strip segment lengths.

In order to gain some of the advantages of both the linear trip strips and the chevron trip strips, while mitigating the resulting downsides, the gaspath components illustrated herein include z-shaped trip strips 214. Each of the z-shaped trip strips includes two locally upstream most portions 211, 213, and two locally downstream most portions 215, 217. As used herein locally upstream most refers to a position where there is not an adjacent portion of the trip strip that is upstream of the position. Similarly, locally downstream most refers to a position where there is not an adjacent portion of the trip strip that is downstream of the position.

The upstream position is typically the first location in which the internal cooling flow immediately adjacent to the rib roughened wall initially contacts the turbulating feature (trip strip) and is coincident with the highest convective heat transfer location. Conversely the downstream position is typically the furthest location in which the internal cooling flow is in contact and/or comes in contact with the turbulating feature and is the location which has the lowest level of internal convective heat transfer augmentation.

Further, in each of the blade 110, and the vane 130, it is appreciated that greater cooling is required at or near the exterior edges of at least some of the internal cooling passages 210. In order to meet this greater cooling requirement, in the internal cooling passage 210 adjacent the leading edge (LE) one of the locally upstream positions 211, 213 of each z-shaped trip strip 214 is positioned at the leading edge (LE). Similarly, in the internal cooling passage 210 adjacent the trailing edge TE, one of the locally upstream most positions 211, 213 of each z-shaped trip strip is positioned at the trailing edge.

In examples such as the blade 110 (FIG. 3A), where fluid is passing through both internal cooling passages 210 in the same direction, the z-shaped trip strips 214 in the internal cooling passages 210 adjacent to the trailing edge TE are inverted, relative to those in the internal cooling passage 210 adjacent to the leading edge LE. In contrast, gaspath components where the internal cooling passages 210 include reversed flow directions between the internal cooling passages 210, such as the vane 130 (FIG. 3B), result in substantially identical z-shaped trip strips 214 in each of the internal cooling passages 210.

With continued reference to FIGS. 2, 3A and 3B, FIG. 4 schematically illustrates an exemplary platform 300, such as the blade platforms 112, or the vane platforms 132, 134 of FIG. 2. Extending outward from the platform 300 is the blade or vane 310, which can include the internal flowpath passages 312, as discussed with regards to FIG. 3A and FIG. 3B. The exemplary platform 300 includes a first internal cooling passage 320 along the trailing edge TE and a second internal cooling passage 330 along a side edge 332. Each of the internal cooling passages 320, 330 is tapered, such that the passage is wider at an upstream end 324, 334, relative to cooling flow through the passage 320, 330 and narrower at a downstream end 326, 336.

Due to the tapered nature of the internal cooling passages 320, 330, locally upstream most positions 321, 323, 331, 333 of each of the z-shaped trip strips 328, 338 are not at the same position, relative to flow through the internal cooling passage 320, 330. Further, in the second internal cooling passage, each the z-shaped trip strips 338 include at least one discontinuity 339. The inclusion of the discontinuity 339 decreases a pressure loss of the cooling fluid as the cooling fluid passes through the internal cooling passage 330. In the illustrated example, the discontinuity 339 occurs at one of the locally downstream most positions of each z-shaped trip strip 338, however it is understood that depending on the particular needs of a given trip strip 338, or internal cooling passage 320, 330, the discontinuity 339 may be incorporated at one of the locally upstream most positions 331 instead.

With continued reference to FIGS. 2-4, FIG. 5 schematically illustrates a cross section of the blade outer air seal (BOAS) 120 of FIG. 2 along cross section line A-A. The exemplary BOAS 120 includes three internal cooling passages 410, 420, 430, each of which includes multiple z-shaped trip strips 412, 422, 432. As with the blade examples, each of the z-shaped trip strips 412, in the internal cooling passage 410 adjacent the leading edge LE includes a local upstream most position 411 at the leading edge wall 450. Similarly, each of the z-shaped trip strips 432 in the internal cooling passage 430 adjacent the trailing edge TE includes a locally upstream most position 431 contacting the trailing edge wall 452.

With regards to all Figures, and the description contained herein, reference to a z-shaped configuration for the trip strips refers to a trip strip configuration where the trip strip includes at least two locally upstream most positions, and at least two locally downstream most positions. While a portion of these positions are illustrated as being ninety degree angled corners, it should be understood that alternate angles, and/or gradual bends can be utilized in place of the illustrated corners without requiring substantial modification to the described system.

Further, while specific examples are illustrated including a single discontinuity within the z-shaped trip strip at the locally upstream most position, it should be appreciated that the discontinuity can be positioned at any locally upstream most or locally downstream most position, and examples are envisioned including two or more additional discontinuities.

With continued reference to FIGS. 1-5, FIG. 6 schematically illustrates an example turbine blade 500 including two internal cooling passages 510. Disposed on at least one wall of the internal cooling passages 510 are multiple z-shaped trip strips 514. Each of the z-shaped trip strips 514 includes two discontinuities 530. The exemplary discontinuities are each disposed at a locally upstream or locally downstream most position on the trip strips. The length between the z-shaped discontinuities 530 is dictated by the internal cooling passage geometry width and desired local and average internal convective heat transfer requirements. In some instances the number of z-shaped trip strips 530 between any upstream and downstream location may vary in distance.

Figure 7A:
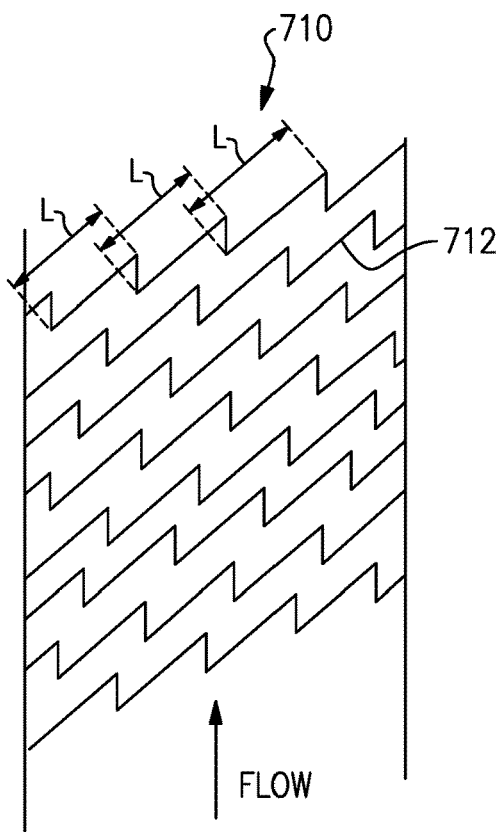
FIGS. 7A and 7B illustrate highly schematic internal cooling passages as could be incorporated in any of the structures of FIGS. 1-6.
Figure 7B:
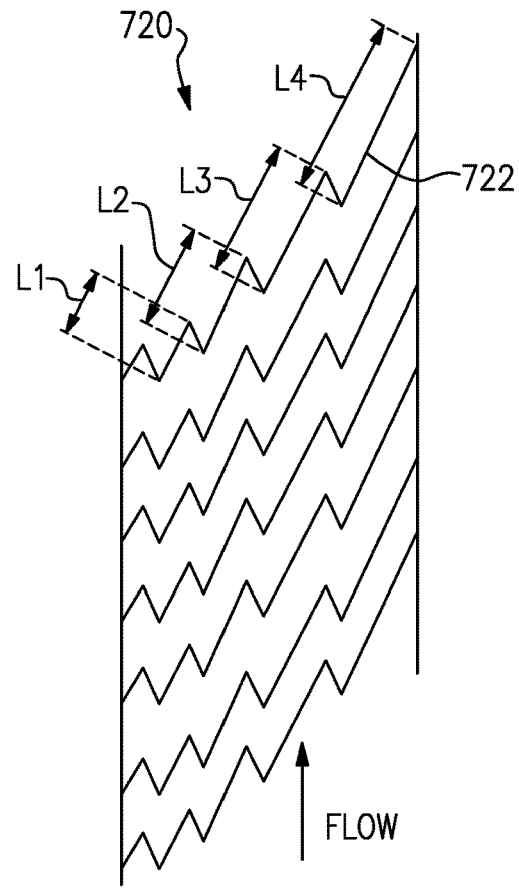

With continued reference to FIGS. 1-6, FIGS. 7A and 7B illustrate highly schematic internal cooling passages 710, 720, as could be incorporated in any of the structures of FIGS. 1-6. The z-shaped trip strips in the example of FIG. 7A are characterized as having a uniform segment length L. In contrast, the z-shaped trip strips 722 in the example of FIG. 7B are characterized by having varied segment lengths L1, L2, L3, L4.

The length of the segments of the z-shaped trip strips 712, 722 that exists between consecutive z-shaped features may be relatively short and range from $(2.5 \leq L/H \leq 5)$ where L is the length of the segment of the z-shaped trip strip 530 and H is the height of the z-shaped trip strip 530. Similarly the relative distance between consecutive z-shaped trip strips 530 may comprise of either equidistant and/or varying distances depending on local convective thermal cooling requirements and pressure loss considerations.

With continued reference to FIGS. 1-6, FIG. 8 illustrates a highly schematic internal cooling passage 810 including multiple z-shaped trip strips 820. The z-shaped trip strips 820 of the example of FIG. 8 include multiple variable angle z-shaped trip strips 820. Each of the z-shaped trip strips defines a corner angle 822, 824, 826, 828 at each of the locally downstream most positions 832 and locally upstream most positions 834 of the z-shaped trip strips 820.

Figure 8:
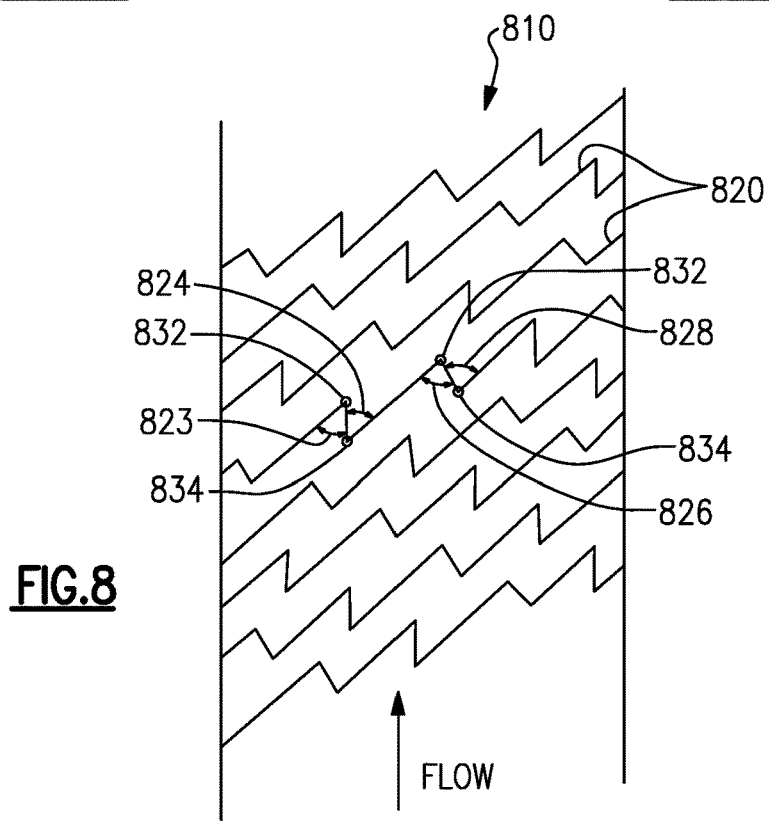
FIG. 8 schematically illustrates a highly schematic internal cooling passage as could be incorporated in any of the structures of FIGS. 1-6.

As illustrated in the example of FIG. 8, the angles 822, 824, 826, 828 can vary from corner to corner within a single z-shaped trip strip 820. In alternative examples, the angles 822, 824, 826, 828 can be uniform within each z-shaped trip strip 820, but vary from z-shaped trip strip to z-shaped trip strip within the same passage 810. In yet further examples, the angles 822, 824, 826, 828 in a given z-shaped trip strip can be constant at each of the locally downstream most positions 832, constant at each of the locally upstream most positions 834, but the angle at the locally downstream most positions 832 is distinct from the angle at the corresponding locally upstream most positions 834.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gaspath component for a gas turbine engine comprising:
    a platform including a first internal cooling passage and a second internal cooling passage; and
    each of said first and second internal cooling passages having a plurality of trip strips extending into the cooling passage from at least one internal surface of the cooling passage, each of the trip strips being defined by a z-shaped configuration;
    wherein the first internal cooling passage is adjacent a first platform edge, the second internal cooling passage is adjacent a second platform edge; and a locally upstream most portion of each trip strip within the second internal cooling passage contacts a wall adjacent to the second platform edge.

2. The gaspath component of claim 1, wherein the platform is one of a blade outer air seal a combustor panel, a vane platform, and a blade platform.

3. The gaspath component of claim 1, wherein the z-shaped configuration is continuous.

4. The gaspath component of claim 1, wherein the z-shaped configuration includes at least one discontinuity.

5. The gaspath component of claim 4, wherein the at least one discontinuity is positioned at one of a locally upstream most position and a locally downstream most position of the trip strip.

6. The gaspath component of claim 1, wherein a locally upstream most portion of each trip strip within the first internal cooling passage contacts a wall adjacent to the first platform edge.

7. The gaspath component of claim 1, wherein an orientation of each trip strip in the first internal cooling passage is inverted relative to an orientation of each trip strip in the second internal cooling passage.

8. The gaspath component of claim 1, wherein each of the trip strips includes a plurality of z-shaped configurations, each of the z-shaped configurations being defined by a first segment, a second segment and a third segment and wherein at least one of the first segment and the third segment of a given z-shaped configuration is the other of the first segment and the third segment of an adjacent z-shaped configuration.

9. The gaspath component of claim 8, wherein each of the first segments and each of the third segments has the same length.

10. The gaspath component of claim 8, wherein at least one of the first segments and the third segments has a distinct length from at least one other of the first segments and the third segments.

11. The gaspath component of claim 1, wherein an angle defined by each trip strip in the plurality of trip strips at a locally upstream most position is distinct from an angle defined by the trip strip at a corresponding locally downstream most position.

12. The gaspath component of claim 1, wherein each angle defined by a locally upstream most position of the z-shaped trip strip is identical.

13. The gaspath component of claim 1, wherein at least one angle defined by a locally upstream most position of the z-shaped trip strip is distinct form at an angle defined by at least one other locally upstream most position of the z-shaped trip strip.

14. A gaspath component for a gas turbine engine comprising:
an airfoil shaped component including at least a first internal cooling passage and a second internal cooling passage;
the first and second internal cooling passage each having a corresponding plurality of trip strips extending into the cooling passage from at least one internal surface of the cooling passage, each of the trip strips in the corresponding plurality of trip strips being defined by a discontinuous z-shaped configuration, wherein the z-shaped configuration includes a plurality of straight portions, a plurality of locally upstream most positions and a plurality of locally downstream most positions, with a straight portion of said plurality of straight portions extending from each of said locally upstream most portions toward one of said locally downstream most portions in the plurality of locally downstream most portions;
wherein the first internal cooling passage is adjacent a first airfoil shaped component edge, the second internal cooling passage is adjacent a second airfoil shaped component edge; and
a locally upstream most portion of each trip strip within the second internal cooling passage contacts a wall adjacent to the second airfoil shaped component edge.

15. The gaspath component of claim 14, wherein the airfoil shaped component is one of a blade and a vane.

16. The gaspath component of claim 14, wherein the at least one internal cooling passage includes a first internal cooling passage and a second internal cooling passage, and wherein the first internal cooling passage is adjacent a leading edge of the airfoil shaped component.

17. The gaspath component of claim 16, wherein a locally upstream most portion of each trip strip within the first internal cooling passage contacts a leading edge wall.

18. The gaspath component of claim 17, wherein the second internal cooling passage is adjacent to a trailing edge of the airfoil shaped component, and wherein a locally upstream most portion of each trip strip within the second internal cooling passage is adjacent to the trailing edge of the airfoil shaped component.

19. The gaspath component of claim 16, wherein an orientation of each trip strip in the first internal cooling passage is inverted relative to an orientation of each trip strip in the second internal cooling passage.

20. The gaspath component of claim 14, wherein at least one discontinuity of the discontinuous z-shaped configuration is positioned at one of a locally upstream most position and a locally downstream most position of the trip strip.

21. The gaspath component of claim 20, wherein a first upstream most position and a second upstream most position of each trip strip in the plurality of trip strips is at a same position, relative to an expected flow of fluid through the internal cooling passage.

22. The gaspath component of claim 14, further comprising a platform from which the airfoil shaped component extends, and wherein the platform includes at least one internal platform cooling passage having a second plurality of z-shaped trip strips.

23. The gaspath component of claim 22, wherein each trip strip in the second plurality of trip strips is discontinuous.

24. The A gaspath component for a gas turbine engine comprising: a platform including at least one internal cooling passage; and the at least one internal cooling passage having a plurality of trip strips extending into the cooling passage from at least one internal surface of the cooling passage, each of the trip strips being defined by a z-shaped configuration, wherein the z-shaped configuration includes a plurality of straight portions, a plurality of locally upstream most positions and a plurality of locally downstream most positions, with a straight portion of said plurality of straight portions extending from each of said locally upstream most portions toward one of said locally downstream most portions in the plurality of locally downstream most portions, the at least one internal cooling passage including a first internal cooling passage and a second internal cooling passage, and wherein the first internal cooling passage is adjacent a first platform edge; and wherein the second internal cooling passage is adjacent to a second platform edge, and wherein a locally upstream most portion of each trip strip within the second internal cooling passage contacts a wall adjacent to the second platform edge.

* * * * *